United States Patent Office 3,845,166
Patented Oct. 29, 1974

3,845,166
CURABLE COMPOSITION COMPRISING POLYVINYL CHLORIDE, CHLORINATED POLYOLEFIN AND AN ETHYLENE POLYMER, AND THE CURED PRODUCT THEREOF
Joseph Ellwood Betts, Westport, and Stanton Curry Martens, New Haven, Conn., assignors to General Electric Company, New York, N.Y.
No Drawing. Continuation-in-part of application Ser. No. 131,395, Apr. 5, 1971, which is a continuation-in-part of application Ser. No. 693,076, Dec. 26, 1967, both now abandoned. This application July 5, 1973, Ser. No. 376,722
Int. Cl. C08f 29/24
U.S. Cl. 260—897 C                                        13 Claims

ABSTRACT OF THE DISCLOSURE

A curable composition, especially adaptable for use as insulation for wire and cable, comprising (a) polyvinyl chloride and a chlorinated polyolefin in the weight ratio of about 45:55 to 55:45 parts, and an ethylene polymer present in the range of about 2 to 10 percent by weight of the total weight of polymer content, (b) a stabilizer for said chlorinated polymers, and (c) a curing agent. Preferably, the composition includes in addition 4,4'-thiobis-(6-tert-butyl-m-cresol) as an antioxidant and triallyl cyanurate as a co-agent or co-reactant to enhance cross-linking.

---

This application is a continuation-in-part of our copending application Ser. No. 131,395, filed Apr. 5, 1971, now abandoned, which in turn was a continuation-in-part of then copending application Ser. No. 693,076, filed Dec. 26, 1967 and now abandoned.

Polyvinyl chloride exhibits many desirable properties which render it useful for fabricated or molded products. These desirable properties include, for example, mechanical toughness, resistance to chemicals and flame, and a number of relatively good electrical properties, and as a further advantage the polymer is relatively low in cost. However, polyvinyl chloride is rigid and lacks flexibility, especially at lower temperatures. In addition, polyvinyl chloride is inherently a thermoplastic which will soften and deform at elevated temperatures, especially above 121° C., and will flow excessively at a temperature of 150° C. and above. As a still further disadvantage, the polymer has a high viscosity and therefore is difficult to compound and process without the use of certain plasticizing agents. However, the use of these plasticizing agents is limited in that certain types impair the electrical properties of the composition, most notably the insulation resistance and the specific inductive capacitance, and others are known to substantially increase the thermoplastic flow characteristics.

Many applications require the use of polymeric compositions exhibiting the desired properties of polyvinyl chloride, but nonetheless must be processable so that the composition can be properly compounded and fabricated to the desired shape. For example, cable for locomotive and car equipment (commonly referred to as locomotive cable) must exhibit not only good electrical and mechanical properties because of high current capacities and severe surface conditions, but in addition must be resistant to chemicals (including Diesel fuel) and flame. However, such locomotive cable must be flexible as well, and further must be able to withstand both low and high temperatures particularly in view of the fact that the cable may be exposed to the atmosphere and all weather conditions.

In order to achieve a locomotive cable possessing suitable properties, one commercially available cable comprises a two-layer insulation structure having a synthetic rubber composition as the primary insulation layer jacketed with a separate layer of neoprene. This two-layer construction is costly to process. Moreover, the cable diameter is large, and the cable therefore occupies excessive space in the locomotive or car. The temperature rating for this cable as determined by the retention of properties at elevated temperatures for prolonged periods is only 75° C., which currently is not considered adequate for locomotive cable applications. Another cable in commercial use as locomotive cable comprises a single insulation layer containing chlorosulfonated polyethylene as the base polymer. However, the electrical properties, especially insulation resistance, are relatively inferior to the rubber-neoprene cable. Moreover, chlorosulfonated polyethylene is relatively expensive and compositions based on this compound are consequently high in cost.

In order to utilize most or all of the desired properties of polyvinyl chloride, and further to overcome certain of its disadvantages including processability, it has been proposed to compound or blend the polyvinyl chloride with another chlorinated polymer such as chlorinated polyethylene. However, such polymeric blends as taught by the prior art are usually thermoplastic and do not exhibit adequate properties useful for insulation for wire and cable, especially as locomotive cable described above.

This invention has therefore as among its purposes to provide a thermosetting curable composition which is readily processable by conventional means and which, upon cure, to a thermoset state, exhibits superior electrical and physical properties, and is especially useful as insulation for locomotive cable.

In accordance with a broad aspect of the invention, there is provided a curable, thermosetting composition, especially adaptable as insulating material for wire and cable, comprising (a) polyvinyl chloride and a chlorinated polyolefin within the ratios of about 45:55 to 55:45 parts by weight and a relatively small amount of an ethylene polymer present in the range of about 2 to 10 percent by weight of the total weight of the polyvinyl chloride and chlorinated polyethylene polymer content, (b) a stabilizer for said chlorinated polymers, and (c) a curing agent. In the preferred embodiment, the composition include 4,4'-thiobis-(6-tert-butyl-m-cresol) as an antioxidant, and where desired triallyl cyanurate may be incorporated in the composition, to enhance cross-linking. In preparing the composition, the polymers may be intimately admixed as in a Banbury, the stabilizer is added to the polymeric admixture and blending is continued at an elevated temperature. A suitable curing agent, desirably a tertiary peroxide, and other additives such as the antioxidant, pigment, coagent, etc., are incorporated into the mix. The composition is subsequently fabricated as by extrusion over a conductor to provide an insulation layer, and then cured to form a thermoset or cross-linked insulation.

The cured, thermoset polymeric composition of this invention unexpectedly exhibits a multiplicity of diverse and very significant attributes, some of which appear incompatible or antithetical to each other, such as a high degree of flexibility and elasticity together with high tensile strength and exceptional toughness or resistance to penetration or cutting, crushing and abrasion. The collective attributes of the products of this invention provide an unsurpassed electrical insulating material for wire and cable conductors for services encountering exposure to all weather extremes, solvents and petroleum materials, very high and very low temperatures, severe mechanical abuse, and the like typified by the rigorous conditions incurred with railroad rolling stock.

The terms "wire" and "cable" are used herein and in the appended claims as synonymous terms to refer to an insulated conductor.

The polymeric components for the composition of this invention are well known and readily available. Polyvinyl chloride used in the invention may be the suspension polymerized polymer, emulsion polymerized polymer or the bulk polymerized polymer, and desirably is of relatively high molecular weight. It should be understood that polyvinyl chloride may include the vinyl chloride homopolymer or interpolymers of vinyl chloride with interpolymerizable monomers such as vinyl acetate, vinyl stearate, vinylidene chloride, acrylonitrile, ethyl acrylate, and the like, and containing not less than 90 percent by weight of vinyl chloride. The chlorinated polyolefin component may include any polymer or copolymer of the lower alpha olefins, such as ethylene, propylene, isobutylene, and the like, and also may include chlorosulfonated polyethylene. In the preferred embodiment of the invention, the polyolefin is chlorinated polyethylene, of either the linear or non-linear variety, and desirably contains about 25 to 45 percent by weight of chlorine. Although the invention is described hereinafter with specific reference to chlorinated polyethylene, it should be understood that other chlorinated polyolefins are also useful.

The relative proportions for each of the two chlorinated polymers to provide the combination of attributes of the product of this invention comprise specific ratios of polyvinyl chloride to chlorinated polyethylene of within about 45:55 to 55:45 parts by weight and more preferably about equal parts of approximately 50 to 50 parts by weight. The polyvinyl chloride contributes numerous desirable physical and electrical properties, and further improves the toughness and cut resistance of the cured composition. The chlorinated polyethylene enhances certain physical properties of the cured product such as flexibility at low temperatures and elongation measured at room temperature. If significantly less polyvinyl chloride is employed than designated, the cured composition is soft and exhibits a marked decrease or loss in toughness, and therefore less useful or versatile for most applications as an insulation material. On the other hand, if significantly less than the designated amount of chlorinated polyethylene is used, the cured composition is excessively rigid and exhibits a very low elongation, which make the composition particularly useless at very low temperatures as in the neighborhood of —40° C. In addition, both chlorinated polymers are flame retardant and therefore contribute to the flame retardance of the composition, and further the polyvinyl chloride is resistant to chemicals, moisture and ozone. For many applications it is desirable or essential that the insulated wire or cable exhibit maximum flame resistance, and numerous insulation compositions must pass the vertical flame test established by Underwriters' Laboratories (or by I.P.C.E.A.) before being commercially acceptable. Therefore, the polymeric blend should contain about 25 to 53 percent by weight chlorine, and preferably about 40 to 50 percent by weight, but this may vary somewhat depending upon the flame retardant properties required for end use. Also, the chlorine content for the chlorinated polymers may vary, and therefore the ratio or components used in the blend will depend somewhat on this chlorine content and upon the specific properties sought for the end product. Compositions made in accordance with this invention containing less than about 25 percent by weight of chlorine of the polymeric blend are generally unsatisfactory as not being sufficiently flame retardant for many applications, and this minimum amount is desirable as assurance that the cable meets the vertical flame test specified by Underwriters' Laboratories (or by I.P.C.E.A.). Also, the blended composition should not contain more than about 53 percent by weight of chlorine because higher amounts are uneconomical and further can adversely affect the mechanical properties of the composition, such as tensile strength.

The ethylene polymer includes polyethylene, copolymers of ethylene and propylene, terpolymers of ethylene and propylene, and other copolymers containing not less than about 70 percent by weight ethylene including for example, ethylene vinyl acetate, ethylene ethyl acrylate and ethylene butene-1. Of these, polyethylene is preferred, and although the invention is described below with specific references to polyethylene, it should be understood that the copolymers of ethylene are also applicable.

Polyethylene, or other suitable ethylene polymers, improves the processability of the composition in that the polyethylene lowers the viscosity (plasticity) of the polymeric composition and acts as a lubricant. A suitable amount of polyethylene incorporated into the curable compound ranges from about 3 to 10 percent by weight of the total polyvinyl chloride and chlorinated polyethylene polymer content, and more preferably about 5 to 8 percent by weight. If less than about 2 percent polyethylene is used, there appears to be no benefit derived from the use of polyethylene as a processing aid, while on the other hand exceeding the maximum described may adversely affect the physical properties sought, especially with regards to excessive swelling caused by Diesel fuel.

A suitable stabilizing agent is incorporated into the curable composition during the compounding operation to assure cross-linking of the polymers by neutralizing any free acid formed, thereby inhibiting a chain-like reaction resulting in the destruction of the polymer. Such stabilizing agents include, for example, lead oxide or litharge, tri-basic lead silicate-sulphate, di-basic lead phthalate, basic lead silicate and magnesium oxide. The amount of stabilizing agent used will depend upon the amount of chlorinated polymer present, but generally will range from about 5 to 40 parts based on 100 parts of polymeric blend, and more preferably about 10 to 35 parts. Lower amounts than this generally will not be sufficient to assure the desired cross-linking, whereas there generally is no benefit in employing higher amounts which also may be unecomonical.

In the preferred embodiment, a suitable antioxidant is incorporated into the curable composition to improve the heat aging properties of the cured compound. For this purpose, about 0.1 to 2 parts by weight per 100 parts of polymer, and preferably about 0.2 to 1 part, of 4,4'-thio-bis-(6-tert-butyl-m-cresol) is added to the curable composition. The usual mechanism of degradation for polyvinyl chloride and chlorinated polyethylene is not oxidation, and therefore the use of an antioxidant was not necessarily expected. In fact, certain antioxidants commonly employed in polymeric compositions are not suitable as antioxidants for this compound. For example, polymerized 1,2-dihydro-2,2,4-trimethyl quinoline and a reaction product of diphenylamine and acetone (marketed under the trade name Aminox) show little or no beneficial effect on elevated temperature heat aging properties. On the other hand, 4,4'-thiobis-(6-tert-butyl-m-cresol) shows significant improvement in thermal aging at elevated temperatures such as at a temperature of 136° C.

Where desired, a small amount of triallyl cyanurate in the order of 0.25 to 3 parts by weight per 100 parts of polymer, and preferably 0.4 to 1 part, may be incorporated into the curable composition as a co-agent or co-reactant to enhance cross-linking. Although triallyl cyanurate is known to improve cross-linking of polymeric compositions, the amount used is normally in the range of about 5 to 40 parts by weight. This high amount of triallyl cyanurate impairs both the electrical properties, especially insulation resistance, and low temperature properties, e.g., cold blending or flexibility, of the composition of this invention, and further is relatively expensive. We have found with the composition of this invention, a small amount only of triallyl cyanurate is required in order to enhance cross-linking thereby overcoming the disadvantages normally attributed to the use of triallyl cyanurate.

Additional components which desirably are present in the composition and compounded with the polymeric blend include, for example, a lubricant such as microcrystalline wax or calcium stearate to prevent the composition from sticking during fabrication, and a small amount of pigment or coloring agent, such as carbon black. Where desired, non-combustible additives such as antimony oxide may be incorporated in the compound.

A suitable curing agent is incorporated with the admixture during the compounding operation. In the typical compounding operation such as on a 2-roll rubber mill or in a Banbury mixer, the polymeric materials are added first, then the stabilizer and any other additives such as antioxidant, pigment, etc., and lastly the curing agent. The compounding operation is conducted within a temperature range high enough to render the admixture sufficiently plastic to work, but below the reacting temperature or decomposition temperature of the curing agent so that the curing agent will not decompose thereby causing at least partially or incipient curing of the polymeric stock during the normal mixing cycle. Desirably, the curing agent employed in the operation is an organic peroxide, such as a tertiary peroxide, and characterized by at least one unit of the structure

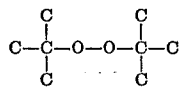

which decomposes at a temperature in excess of about 275° F. The use of these peroxide curing agents in effecting cross-linking of polymers such as polyethylene compounds is adequately described in U.S. Pats. 3,079,370; 2,888,424; 3,085,966; and 3,214,422, which patents are incorporated in this specification by reference. The most commonly used peroxide curing agent, and the agent preferred, is di-α-cumyl peroxide. Other useful curing agents include the tertiary diperoxides such as 2,5-dimethyl-2,5 (t-butyl peroxy) hexane and 2,5-dimethyl-2,5 (t-butyl peroxy) hexyne-3, and the like diperoxy compounds.

Peroxide curing agents of the foregoing types must be included in the combination of polymeric and other ingredients in amounts of at least about 2 parts up to about 8 parts by weight of peroxide per hundred parts of polymer to form a cured polymeric product providing the collective attributes of the invention which render it a superior electrical insulating material for vigorous service conditions. Preferably the peroxide curing agents are included in amounts within a range of from about 2.5 to 5 parts of peroxide by weight.

In a typical production operation employing a tertiary peroxide as a curing agent, compounding is conducted at a temperature of from about 200 to 275° C. If compounding is conducted at a temperature much higher than the stated maximum, the peroxide will decompose thereby causing premature curing of at least a portion of the polymer. As a consequence, the compound will be difficult to fabricate and the final product will exhibit an irregular or roughened surface. The resulting compounded admixture is subsequently fabricated as by extrusion to provide an insulation cover for wire or cable. The fabricated cover is then cured such as by conventional steam curing at about 225 to 250 p.s.i.g.

In preparing the composition of this invention, a polymeric blend contributing to optimum properties comprises about equal parts by weight of polyvinyl chloride and chlorinated polyethylene and about 5 parts by weight polyethylene. The cured product from this recipe compounded as described above exhibits many desirable physical and electrical properties. For example, the cured composition retains the tensile strength and toughness of polyvinyl chloride, is sufficiently flame retardant to pass the vertical flame test specified by Underwriters' Laboratories, resistant to chemicals and moisture, and particularly significantly exhibits improved flexibility in that the cured product is flexible at temperatures as low as −40° C. as determined by the A.S.T.M. cold bend test D-746. In addition, the cured composition exhibits a high insulation resistance especially at elevated temperatures, a high dielectric strength and a relatively low specific inductive capacitance. These properties and other advantages of the invention are illustrated in the examples hereinbelow.

EXAMPLE I

An insulation composition was compounded in a Banbury by conventional means according to the following recipe:

| Component: | Parts by weight |
|---|---|
| Polyvinyl chloride (Pliovic K–90–E, 56% by weight chlorine) | 50 |
| Chlorinated polyethylene (Mooney viscosity ML at 212° F. (1+4 min.) of 45, 36% by weight chlorine) | 50 |
| Lead oxide (stabilizer) | 15 |
| Polyethylene (density .918) | 5 |
| Medium thermal carbon black | 5 |
| Microcrystalline wax (melting point 135° F.) | 1 |
| Di α cumyl peroxide curing agent (90% active) | 2.5 |
| Triallyl cyanurate | 0.5 |
| 4,4'-thiobis-(6-tert-butyl-m-cresol) | 0.25 |

The compounded composition was extruded at a wall thickness of 31 mils on a No. 14 AWG stranded and tinned copper conductor, and cured in a steam chamber maintained at about 240 p.s.i.g.

This product has particular application as a locomotive cable and was evaluated by comparison to the two commercially available locomotive cables described above and referred to hereinbelow as Standard A and Standard B. Standard A is the two-layer construction having a nominal insulation wall thickness of 62 mils on a No. 14 AWG stranded conductor (the styrene-butadiene primary insulation having a wall thickness of 46 mils, and the neoprene jacket having a thickness of 16 mils), and complied with Association of American Railroads Specification No. 581.3. Standard B complied with Association of American Railroads Specification No. 589 employing a chemically cross-linked chlorosulfonated polyethylene insulation having a nominal wall thickness of 47 mils also extruded over a No. 14 AWG stranded conductor and cured in a steam chamber at a pressure of about 235 p.s.i.g.

Samples of the composition of this invention and of the two standards were tested. The test results set forth in Table I below illustrate that the product of this invention is in several respect superior to the conventional commercial products. The I.P.C.E.A. tests are set forth in I.P.C.E.A. Publication No. S–19–81. Certain tests cannot be run on the composite structure Standard A.

TABLE I.—PHYSICAL AND ELECTRICAL PROPERTIES OF SAMPLES

| Test | New product | Standard A | Standard B |
|---|---|---|---|
| Original Physicals (A.S.T.M. D412-66): | | | |
|     Tensile strength, p.s.i. | 3,400 | X | 2,220. |
|     Elongation, percent | 225 | X | 555. |
| Physicals at 150° C. (A.S.T.M. D412-66): | | | |
|     Tensile strength, p.s.i. | 295 | X | 295. |
|     Elongation, percent | 210 | X | 150. |
| Vertical Flame (I.P.C.E.A. 6.19.6) | Passed. | Passed. | Passed. |
| Ozone (I.P.C.E.A. 68), 0.03% conc., ¼" diam. mandrel | No cracking after 20 hours. | Cracked after ½ hour. | No cracking after 20 hours. |
| Oil Immersion, percent change diameter | +14.5 | +31 | +9. |
| Aging Tests: | | | |
|   Air oven (I.P.C.E.A. 6.4.14.3), 7 days at 121° C.: | | | |
|     Percent original tensile | 103 | Cracks on bending | 89.5. |
|     Percent original elongation | 71 | do | 70.5. |
|   Air bomb (I.P.C.E.A. 6.4.14.4), 42 hours at 127° C.: | | | |
|     Percent original tensile | 98 | X | 87. |
|     Percent original elongation | 83 | X | 81. |
|   Oxygen bomb (I.P.C.E.A. 6.4.14.2), 7 days at 80° C.: | | | |
|     Percent original tensile | 101 | X | 98. |
|     Percent original elongation | 89 | X | 97. |
|   Oil immersion (I.P.C.E.A. 6.4.14.5), ASTM No. 2 oil, 18 hours at 121° C.: | | | |
|     Percent original tensile | 96 | X | 100. |
|     Percent original elongation | 82 | X | 89. |
| Brittleness Temperature by Impact (ASTM D746-64T) | −45° C | (*) | −14° C. |
| Dielectric Strength: | | | |
|   Breakdown in kilovolts | 29 kv | 26 kv | 32.5 kv. |
|   Volts per mil | 915 | 410 | 715. |
| Specific Inductive Capacitance (I.P.C.E.A. 6.9.2.4): | | | |
|   24 hours in water at 75° C | 5.5 | 7 | 10. |
|   Percent change: | | | |
|     1-14 days, water at 75° C | +0.55 | +2.59 | −43.2. |
|     7-14 days, water at 75° C | +1.10 | −0.71 | −26.3. |
| Insulation Resistance (I.P.C.E.A. 6.23), 16 hours at 15.6° C. (megohms/1,000 ft.) | 7,760 | 9,010 | 3,290. |
| Insulation resistance constant | 27,760 | 19,300 | 9,030. |

*Styrene-butadiene rubber and neoprene, when measured separately, have a brittleness point at temperatures of −33° C., respectively.

Tensile strength, elongation and all aging tests except the air oven test cannot be run on Standard A, a composite structure.

In the oil immersion test, a 10 inch sample of the cable was immersed in Diesel fuel maintained at 70° C. for 7 days. The percent change in diameter was then measured.

The dielectric strength was conducted substantially as set forth by A.S.T.M. D149, but modified to be run on samples measuring 10 feet in length and stripped back 1 inch from each end. A sample is immersed in tap water at room temperature, and voltage is applied at the rate of 500 to 1000 volts per second until breakdown occurs.

The above tests show that the product of this invention is, in most respects, superior to, and in all other respects at least comparable to, two commercially available cable structures used as locomotive cable. For example, the insulation composition of this invention is relatively resistant to Diesel fuel, and further exhibits flexibility at very low temperatures. In addition, the electrical properties for this product are all superior. Equally significant is that the wall thickness of the cable insulation of this invention is ⅓ to ½ as thick as that required for the two other cables.

EXAMPLE II

It is more meaningful in measuring certain physical properties of a wire or cable to employ a larger size conductor, and for this reason the compound of Example I was extruded and cured over a No. 6 AWG stranded and tinned copper conductor. The results of these properties and the comparison to Standards A and B (on a No. 6 AWG conductor) are shown in Table II below.

TABLE II.—PHYSICAL PROPERTIES

| Test | New product | Standard A | Standard B |
|---|---|---|---|
| Penetration, mils | 15 | 43 | 54 |
| Crush resistance (pounds pressure required to cause short circuit: | | | |
|   As received | 4,223 | 2,478 | 3,023 |
|   After 7 days at 70° C. in Diesel fuel | 1,546 | 940 | 940 |
| Cutting (pounds) | 44 | 40 | 29 |
| Squirrel cage abrasion (3 lbs. weight), cycles required to expose conductor | 1,070 | 51 | 50 |

In the penetration test, a 40 mil rod is placed transverse to the cable, and a 5 pound weight is placed on top of the rod for 4 minutes at room temperature. The depth of penetration is measured with a Randall-Stickney Gauge.

The compression crushing test (crush resistance) was conducted substantially as outlined in Underwriters' Laboratories Subject 493, 'Proposed Standard for Underground Feeder Cable, Type UF," dated Mar. 28, 1967, but modified by using two 2 inch plates. Failure was indicated by closing the electrical circuit through the conductor causing a low voltage buzzer to sound.

The cutting test followed substantially Underwriter's Laboratories Subject 758, "Tentative Outline of the Investigation of Thermoplastic-Insulated Appliance and Hook-Up Wire," dated Oct. 1, 1963. This test was modified to use a 60° angle block with a 10 mil flat edge, and was conducted in an Instron testing machine.

The squirrel cage abrasion test was conducted substantially in accordance with MIL-C-2194D (Navy), paragraph 4.7.17, but modified to use an 8 inch diameter metal drum with 12 abrading tools consisting of 4/16 inch square steel bars set so that the edges of the bars are in the outer periphery. The cage was reciprocated in a 90° arc against the wire sample, and at approximately 15 oscillations per minute.

The tests from this example show the superior performance of the product of this invention, and further show that the product would be particularly useful as insulation for locomotive cable which must withstand severe service conditions.

EXAMPLE III

In order to show the beneficial effect of an ethylene polymer as a processing aid, the following compositions were compounded according to the recipes as shown in Table III.

TABLE III.—RECIPES

| | C | D | E |
|---|---|---|---|
| Polyvinyl choride* | 50 | 50 | 50 |
| Chlorinated polyethylene* | 50 | 50 | 50 |
| Dibasic lead phthalate (stabilizer) | 10 | 10 | 10 |
| Di-α-cumyl peroxide (98% active) | 2.5 | 2.5 | 2.5 |
| Polyethylene (density .918) | | 10 | |
| Ethylene vinyl acetate (17-19% weight vinyl acetate, melt index 2.5) | | | 10 |
| Mooney viscosity, ML at 250° F. (2½+10 min.) | 96 | 71 | 63 |

*Same type as used in Example 1.

It will be observed that the ethylene polymer employed in runs D and E reduced the Mooney viscosity of the curable composition. This is significant with regards to rendering the composition processable as in a Banbury or on a mill.

EXAMPLE IV

This example shows the beneficial effect of employing 4,4'-thiobis-(6-tert-butyl-m-cresol) as an antioxidant. The following compositions were compounded according to the recipes in Table IV below.

TABLE IV.—RECIPES

|  | F | G | H |
|---|---|---|---|
| Polyvinyl chloride* | 50 | 50 | 50 |
| Chlorinated polyethylene* | 50 | 50 | 50 |
| Lead oxide (stabilizer) | 15 | 15 | 15 |
| Polyethylene (density .918) | 5 | 5 | 5 |
| Medium thermal carbon black | 5 | 5 | 5 |
| Microcrystalline wax (melting point 135° F.) | 1 | 1 | 1 |
| Di-α-cumyl peroxide (90% active) | 2.5 | 2.5 | 2.5 |
| 4,4'-thiobis-(6-tert-butyl-m-cresol) | 0 | 0.125 | 0.25 |
| Air oven aging test (I.P.C.E.A. 6.4.14.3), percent original elongation | 56 | 66 | 70 |

*Same type as used in Example 1.

The air oven aging test was conducted in accordance with the test procedure outlined by I.P.C.E.A. except that it was modified by conducting the test at 4 days and at 136° C. It will be observed from the table that compositions G and H which had the antioxidant incorporated therein, showed improved heat aging properties.

EXAMPLE V

As indicated hereinbefore, a high degree of cross-link curing of the polymer components of the combination of ingredients constituting the composition of this invention is necessary to achieve essential attributes of the invention. The composition of this invention therefore essentially include at least about 2 parts by weight of a suitable peroxide curing agent per hundred parts of the total of polyvinyl chloride and chlorinated polyethylene polymers, and preferably more, as is demonstrated by the following Example and recipes given in Table V.

Test samples of each of the recipes of the table were prepared identically by mixing all ingredients together, except the peroxide curing agent, on a two roll mill at 310–330° F. for 5 minutes. Then the given quantities of peroxide curing agent were added in each case to the blends and milled for 2 minutes at 200–230° F. The test specimens were formed by press curing each recipe in panels approximately 75 mils thick for 10 minutes at 370° F.

TABLE V.—RECIPES

|  | I | J | K | L | M |
|---|---|---|---|---|---|
| Polyvinyl chloride | 50 | 50 | 50 | 50 | 50 |
| Chlorinated polyethylene (43% chlorine) | 50 | 50 | 50 | 50 | 50 |
| Polyethylene (density 918) | 5 | 5 | 5 | 5 | 5 |
| Stabilizer: Di-basic lead phthalate | 12 | 12 | 12 | 12 | 12 |
| Calcium stearate | 1 | 1 | 1 | 1 | 1 |
| Antioxidant: 4,4'-thiobis-(6-tert-butyl-m-cresol) | 0.5 | 0.5 | 0.5 | 0.5 | 0.5 |
| Curing agent: 2,5-dimethyl-2,5-bis(t-butyl peroxy)-hexane | 0.5 | 1.0 | 2.0 | 3.0 | 5.0 |
| Extraction in tetrahydrofuram, percent to polymer content | 100 | 100 | 39.0 | 17.3 | 6.3 |
| Original physical properties, tensile, p.s.i. | 1,866 | 1,864 | 1,874 | 2,338 | 2,569 |
| Elongation, percent | 190 | 148 | 170 | 230 | 212 |
| Immersion in Diesel fuel: 7 days at 70° C. | | | | | |
| Percent retention of tensile | 42 | 42 | 69.5 | 78 | 86.5 |
| Percent retention of elongation | 106 | 155 | 118 | 89 | 88 |

This data clearly demonstrates that at least 2 parts of peroxide curing agent is necessary to produce a polymeric compound possessing the overall physical and chemical integrity and endurance to effectively perform as an electrical insulation in railroad service or under similar rigorous conditions of exposure to all weather conditions, high temperatures, petroleum products and solvents, physical abuse, etc., and at the same time possess good electrical properties at all temperature levels.

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. A flexible, thermosetting curable polymeric composition having improved physical and electrical properties, comprising a blend of polymers of polyvinyl chloride and chlorinated polyolefin within the ration of 45:55 to 55:45 parts by weight and about 3 to 10 percent by weight of the total weight of the polyvinyl chloride and chlorinated polyethylene polymer content of an ethylene polymer containing not less than about 70 percent by weight ethylene, said polymeric blend containing at least about 25 percent by weight thereof of chlorine, a stabilizer for said chlorinated polymers, and at least about 2 parts up to about 8 parts by weight of a peroxide cross-linking curing agent per 100 parts of the polyvinyl chloride and chlorinated polyethylene polymer blend, said polymeric composition being cross-link curable to a thermoset composition which is flexible at low temperatures, mechanically tough, resistant to flame, moisture, chemicals, solvents and hot oil, and has stable electrical properties at elevated temperatures.

2. The flexible, thermosetting curable polymeric composition of claim 1, wherein said chlorinated polyolefin is chlorinated polyethylene.

3. The flexible, thermosetting curable polymeric composition of claim 2, wherein said ethylene polymer is polyethylene.

4. The flexible, thermosetting curable polymeric composition of claim 3, wherein said peroxide cross-linking curing agent is a tertiary peroxide, and said polymeric composition includes about 0.1 to 2 parts by weight of 4,4'-thiobis-(6-tert-butyl-m-cresol) per 100 parts of polymers and about 0.25 to 3 parts by weight of trialkyl cyanurate per 100 parts of polymer.

5. A flexible, oil and solvent resistant thermoset polymeric composition having improved physical and electrical properties, comprising the cross-link cured product of a blend of polymers comprising polyvinyl chloride and chlorinated polyolefin within the range of 45:55 to 55:45 parts by weight and about 3 to 10 percent by weight of the total weight of the polyvinyl chloride and chlorinated polyethylene polymer content of an ethylene polymer containing not less than about 70 percent by weight ethylene, said polymeric blend containing at least about 25 percent by weight thereof of chlorine, a stabilizer for said chlorinated polymers, and at least about 2 up to about 8 parts by weight of a peroxide cross-linking curing agent per 100 parts of the polyvinyl chloride and chlorinated polyethylene polymer blend, said cured thermoset polymeric composition being flexible at low temperatures, mechanically tough, resistant to flame, moisture, chemicals, solvents and hot oil, and having stable electrical properties at elevated temperatures.

6. The flexible, oil resistant thermoset polymeric composition of claim 5, wherein said chlorinated polyolefin is chlorinated polyethylene.

7. The flexible, oil resistant thermoset polymeric composition of claim 6, wherein said ethylene polymer is polyethylene.

8. The flexible, oil resistant thermoset polymeric composition of claim 7, wherein said peroxide cross-linking curing agent is a tertiary peroxide, and said polymeric composition includes about 0.1 to 2 parts by weight of 4,4'-thiobis-(6-tert-butyl-m-cresol) per 100 parts of polymer and about 0.25 to 3 parts by weight of trialkyl cyanurate per 100 parts of polymer.

9. A flexible, thermosetting curable polymeric composition having improved physical and electrical properties, comprising a blend of polymers of about 50 parts by weight of polyvinyl chloride and about 50 parts by weight of chlorinated polyethylene and about 5 to 10 parts by weight of polyethylene based upon the total weight of the polyvinyl chloride and chlorinated polyethylene, said polymeric blend containing about 40 to 50 percent by weight thereof of chlorine, a stabilizer for said chlorinated polymers in an amount of about 10 to 35 parts by weight per 100 parts of polymeric blend, and about 2.5 to 5 parts by weight of a tertiary peroxide cross-linking curing agent per 100 parts of the polyvinyl chloride and chlorinated polyethylene polymer blend, and about 0.1 to 2 parts by weight of 4,4'-thiobis-(6-tert-butyl-m-cresol) per 100 parts of polymer blend, said polymeric composition being cross-link curable to a thermoset composition which is flexible at low temperatures, mechanically tough, resistant to flame, moisture, chemicals, solvents and hot oil, and has stable electrical properties over an extended temperature range.

10. A flexible, oil and solvent resistant thermoset polymeric composition having improved physical and electrical properties, comprising the cross-link cured product of a blend of polymers of about 50 parts by weight of polyvinyl chloride and about 50 parts by weight of chlorinated polyethylene and about 5 to 10 parts by weight of polyethylene based upon the total weight of the polyvinyl chloride and chlorinated polyethylene, said polymeric blend containing about 40 to 50 percent by weight thereof of chlorine, a stabilizer for said chlorinated polymers in an amount of about 10 to 35 parts by weight per 100 parts of polymeric blend, and about 2.5 to 5 parts by weight of a tertiary peroxide cross-linking curing agent per 100 parts of the polyvinyl chloride and chlorinated polyethylene polymer blend, and about 0.1 to 2 parts by weight of 4,4'-thiobis-(6-tert-butyl-m-cresol) per 100 parts of polymer, said cured thermoset polymeric composition being flexible at low temperatures, mechanically tough, resistant to flame, moisture, chemicals, solvents and hot oil, and having stable electrical properties at elevated temperatures.

11. An electrical cable comprising a conductor and a layer of insulation overlying said conductor, said insulation consisting of a flexible, oil and solvent resistant thermoset polymeric composition comprising the cross-link cured product of a blend of polymers comprising polyvinyl chloride and chlorinated polyolefin within the range of 45:55 to 55:45 parts by weight and about 2 to 10 percent by weight of the total weight of the polyvinyl chloride and chlorinated polyethylene polymer content of an ethylene polymer containing not less than about 70 percent by weight ethylene, said polymeric blend containing at least about 25 percent thereof chlorine, a stabilizer for said chlorinated polymers, and at least about 2 parts up to about 8 parts by weight of a peroxide cross-linking curing agent per 100 parts of the polyvinyl chloride and chlorinated polyethylene polymer blend, said cured thermoset polymeric composition comprising the insulation being flexible at low temperatures, mechancially tough, resistant to flame, moisture, chemicals, solvents and hot oil and having stable electrical properties at elevated temperatures.

12. The electrical cable of claim 11 having an insulation consisting of a flexible, oil resistant thermoset polymeric composition, wherein the said chlorinated polyolefin is chlorinated polyethylene and the said ethylene polymer is polyethylene.

13. An electrical cable comprising a conductor and a layer of insulation overlying said conductor, said insulation consisting of a flexible, oil and solvent resistant thermoset polymeric composition comprising the cross-link cured product of a blend of polymers comprising about 50 parts by weight of polyvinyl chloride and about 50 parts by weight of chlorinated polyethylene and about 5 to 10 parts by weight of polyethylene based upon the total weight of the polyvinyl chloride and chlorinated polyethylene, said polymeric blend containing about 40 to 50 percent by weight thereof of chlorine, a stabilizer for said chlorinated polymers in an amount of about 10 to 35 parts by weight per 100 parts of polymeric blend, and about 2.5 to 5 parts by weight of a tertiary peroxide cross-linking curing agent per 100 parts of the polyvinyl chloride and chlorinated polyethylene polymer blend, and about 0.1 to 2 parts by weight of 4,4'-thiobis-(6-tert-butyl-m-cresol) per 100 parts of polymer blend, said cured themoset polymeric composition comprising the insulation being flexible at low temperatures, mechanically tough, resistant to flame, moisture, chemicals, solvent and hot oil, and having stable electrical properties at elevated temperatures.

References Cited

UNITED STATES PATENTS

| | | | |
|---|---|---|---|
| 3,283,035 | 11/1966 | Schnebelen | 260—897 |
| 3,209,055 | 9/1965 | Hedberg et al. | 260—897 |
| 3,085,082 | 4/1963 | Baer et al. | 260—45.5 |
| 3,326,828 | 6/1967 | Demazio | 260—23 |

FOREIGN PATENTS

| | | | |
|---|---|---|---|
| 626,534 | 8/1961 | Canada | 260—897 |
| 1,011,498 | 12/1965 | Great Britain | 260—897 |
| 919,453 | 2/1963 | Great Britain | 260—897 |

MURRAY TILLMAN, Primary Examiner

C. J. SECCURO, Assistant Examiner

U.S. Cl. X.R.

117—128.4; 260—23 XA; 28.5 D, 45.7 S, 45.75 R

PO-1050
(5/69)

UNITED STATES PATENT OFFICE
CERTIFICATE OF CORRECTION

Patent No. 3,845,166   Dated October 29, 1974

Inventor(s)  J. E. Betts & S. C. Martens

It is certified that error appears in the above-identified patent and that said Letters Patent are hereby corrected as shown below:

Claim 11, line 14,   after "weight of a" insert "peroxide" and delete - perioxide -

Claim 11, line 18,   after "temperatures," insert "mechanically" and delete - mechancially -

Signed and sealed this 21st day of January 1975.

(SEAL)
Attest:

McCOY M. GIBSON JR.
Attesting Officer

C. MARSHALL DANN
Commissioner of Patents